United States Patent
Yasuda

(10) Patent No.: US 9,952,086 B2
(45) Date of Patent: Apr. 24, 2018

(54) MAGNETIC FLOAT LIQUID LEVEL DETECTOR WITH VERTICALLY REVERSIBLE ATTACHMENT

(71) Applicant: DENSO CORPORATION, Kariya, Aichi-pref. (JP)

(72) Inventor: Atsushi Yasuda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 165 days.

(21) Appl. No.: 14/894,554

(22) PCT Filed: Jun. 3, 2014

(86) PCT No.: PCT/JP2014/002952
§ 371 (c)(1),
(2) Date: Nov. 30, 2015

(87) PCT Pub. No.: WO2014/196194
PCT Pub. Date: Dec. 11, 2014

(65) Prior Publication Data
US 2016/0123791 A1 May 5, 2016

(30) Foreign Application Priority Data
Jun. 5, 2013 (JP) .................................. 2013-119132

(51) Int. Cl.
G01F 23/62 (2006.01)
G01F 23/72 (2006.01)
G01F 23/74 (2006.01)
(52) U.S. Cl.
CPC .............. *G01F 23/62* (2013.01); *G01F 23/72* (2013.01); *G01F 23/74* (2013.01)
(58) Field of Classification Search
CPC .......... G01F 23/62; G01F 23/72; G01F 23/74; H01H 36/02; H01H 35/18
(Continued)

(56) References Cited

U.S. PATENT DOCUMENTS

| 3,495,617 A * | 2/1970 | Zifferer ................... F16K 31/22 |
| | | 137/433 |
| 4,649,898 A * | 3/1987 | Martinson ................. A23L 3/10 |
| | | 126/348 |
| 2008/0072668 A1* | 3/2008 | Miyagawa ............ G01F 23/363 |
| | | 73/319 |

FOREIGN PATENT DOCUMENTS

| GB | 2178238 A * | 2/1987 | ............. G01F 23/74 |
| JP | 56103323 A * | 8/1981 | ........... G01F 23/303 |

(Continued)

OTHER PUBLICATIONS

Machine Translation of JP2002062180A.*

(Continued)

*Primary Examiner* — Peter Macchiarolo
*Assistant Examiner* — David L Singer
(74) *Attorney, Agent, or Firm* — Harness, Dickey & Pierce, P.L.C.

(57) ABSTRACT

A liquid level detector includes a casing having a first regulatory section and a second regulatory section, a float that has its upward and downward displacement restricted by contact with the first regulatory section or the second regulatory section, a magnet body that is held by the float, and a switch mechanism that is switched between an on-state and an off-state. A first distance from a switching plane to the first regulatory section and a second distance from the switching plane to the second regulatory section are both longer than a length from one magnet end face to a bottom end section.

12 Claims, 7 Drawing Sheets

(58) Field of Classification Search
USPC ...... 73/305, 308, 309, 314, 319, 322.5, 431,
73/866.5; 340/623, 624; 200/84 C
See application file for complete search history.

(56) References Cited

FOREIGN PATENT DOCUMENTS

| | | | | |
|---|---|---|---|---|
| JP | S60027324 | A | | 2/1985 |
| JP | S63165721 | A | | 7/1988 |
| JP | 63214621 | A | * | 9/1988 |
| JP | 06167378 | A | * | 6/1994 |
| JP | H10132642 | A | | 5/1998 |
| JP | 2000009521 | A | * | 1/2000 |
| JP | 2002062180 | A | * | 2/2002 |
| JP | 2003194619 | A | | 7/2003 |
| JP | 2003194620 | A | * | 7/2003 |
| JP | 2011153920 | A | | 8/2011 |

OTHER PUBLICATIONS

English Abstract of JP356103323A.*
U.S. Appl. No. 14/894,559, filed Nov. 30, 2015, Yasuda et al.
International Search Report and Written Opinion (in Japanese with English Translation) for PCT/JP2014/002952, dated Jul. 1, 2014; ISA/JP.

* cited by examiner

MAGNETIC FLOAT LIQUID LEVEL DETECTOR WITH VERTICALLY REVERSIBLE ATTACHMENT

CROSS REFERENCE TO RELATED APPLICATIONS

This application is a U.S. National Phase Application under 35 U.S.C. 371 of International Application No. PCT/JP2014/002952 filed on Jun. 3, 2014 and published in Japanese as WO 2014/196194 A1 on Dec. 11, 2014. This application is based on and claims the benefit of priority from Japanese Patent Application No. 2013-119132 filed on Jun. 5, 2013. The entire disclosures of all of the above applications are incorporated herein by reference.

TECHNICAL FIELD

The present disclosure relates to a liquid level detector to detect the height of the surface of a liquid stored in a container.

BACKGROUND ART

A liquid level detector having a float floating on a liquid surface, a magnet retained by the float, and a switch mechanism such as a reed switch to switch from an off-state to an on-state by the movement of the magnet in the gravity direction, such as an oil level sensor disclosed in Patent Document 1 for example, has heretofore been known. In the liquid level detector, the float comes into contact with a housing and a cover constituting a casing and resultantly the vertical movement of the float in the gravity direction is restricted.

PRIOR ART DOCUMENTS

Patent Document

Patent Document 1: JP2003-194619A

Meanwhile, the liquid level detector of Patent Document 1 is supposed to be installed in a position of locating the housing in the gravity direction beyond the cover (hereunder referred to as a "lower attachment position"). In recent years however, it has been required to install the liquid level detector in a position of locating the cover in the gravity direction beyond the housing (hereunder referred to as an "upper attachment position") by vertically reversing the attaching direction of the liquid level detector from the lower attachment position.

When the liquid level detector in which the range of the vertical movement of the float is restricted by the cover and the housing is installed in the upper attachment position however, the switch mechanism can only indicate the operating mode of switching from an off-state to an on-state by the descent of a liquid level. That is, the operating mode of the switch mechanism is completely different between the lower attachment position and the upper attachment position. In order to avoid such change of the operating mode in the switch mechanism, a new casing suitable for the installation in the upper attachment position has to be manufactured and the increase of the number of part types has been caused.

SUMMARY OF INVENTION

The present disclosure addresses the above issues. Thus, it is an objective of the present disclosure to provide a liquid level detector making it possible to vertically reverse the attachment direction without changing the operating mode of switching in a switch mechanism accompanying the descent of a liquid level while a casing of an identical shape is used.

To achieve the objective of the present disclosure, a liquid level detector for detecting a level of a surface of liquid stored in a container in an aspect of the present disclosure includes a casing that is fixed to the container and includes a first regulatory section and a second regulatory section which are opposed to each other in a gravity direction, a float that floats on the surface of liquid and has its upward and downward displacement along the gravity direction restricted by contact of the float with the first regulatory section or the second regulatory section, a magnet body that has a shape extending along the gravity direction and is held by the float to be displaced upward or downward in conformity with the surface of liquid, and a switch mechanism that is held by the casing. When one magnet end face of the magnet body in its extending direction is displaced in the gravity direction beyond a predetermined virtual switching plane, the switch mechanism is switched from one to the other of its on-state and off-state. The casing is assumed to be disposed in a first position where the first regulatory section is located further in the gravity direction than the second regulatory section, and to be disposed in a second position where the second regulatory section is located further in the gravity direction than the first regulatory section. The float is arranged between the first regulatory section and the second regulatory section in a position where a specific bottom end section of the float is directed in the gravity direction regardless of whether the casing is disposed in the first position or in the second position. A first distance from the virtual switching plane to the first regulatory section and a second distance from the virtual switching plane to the second regulatory section are both longer than a length from the one magnet end face to the bottom end section.

In this aspect, in the case of installing a casing in a first position of locating a first regulatory section in the gravity direction beyond a second regulatory section, the first regulatory section located on the lower side restricts the movement of a float in the gravity direction. A first distance between the first regulatory section and a virtual switching plane predetermined in a switch mechanism is set so as to be longer than the dimension from a magnet end face to the bottom end section of the float. Consequently, when a liquid in a container reduces, the magnet end face can move in the gravity direction beyond the switching plane predetermined in the switch mechanism before the bottom end section of the float comes into contact with the first regulatory section. The switch mechanism therefore can switch the on-state and the off-state from one state to the other state in response to the descent of the liquid level.

In contrast, in the case of installing the casing in a second position of locating the second regulatory section in the gravity direction beyond the first regulatory section, the second regulatory section located on the lower side restricts the movement of the float in the gravity direction. On this occasion too, the float is arranged in the position of directing the bottom end section toward the gravity direction. In addition, the distance between the second regulatory section and the switching plane is set so as to be longer than the dimension from the magnet end face to the bottom end section of the float in the same manner as the first distance. Consequently, when a liquid in the container reduces, the magnet end face can move in the gravity direction beyond the switching plane before the bottom end section of the float comes into contact with the second regulatory section. The switch mechanism therefore can switch the on-state and the off-state from one state to the other state in response to the descent of the liquid level in the same manner as the case of installing the casing in the first position.

Consequently, it is possible to vertically reverse the attachment direction of a liquid level detector without changing the operating mode of switching in a switch mechanism accompanying the descent of the liquid level while a casing of an identical shape is used.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Embodiments are explained hereunder in reference to the drawings. Here, a duplicate explanation is sometimes avoided by using an identical code for corresponding constituent components in the embodiments When only a part of a configuration is explained in each of the embodiments, it is possible to apply the configuration of another previously explained embodiment to the other part of the configuration. Further, it is possible to not only combine the configurations clarified in the explanations of the embodiments but also partially combine the configurations of the embodiments even when it is not specified as long as the combination does not cause a problem. Then a not-clarified combination of configurations described in the embodiments and modified examples is also regarded as disclosed in the following explanations.

First Embodiment

Figure 1:
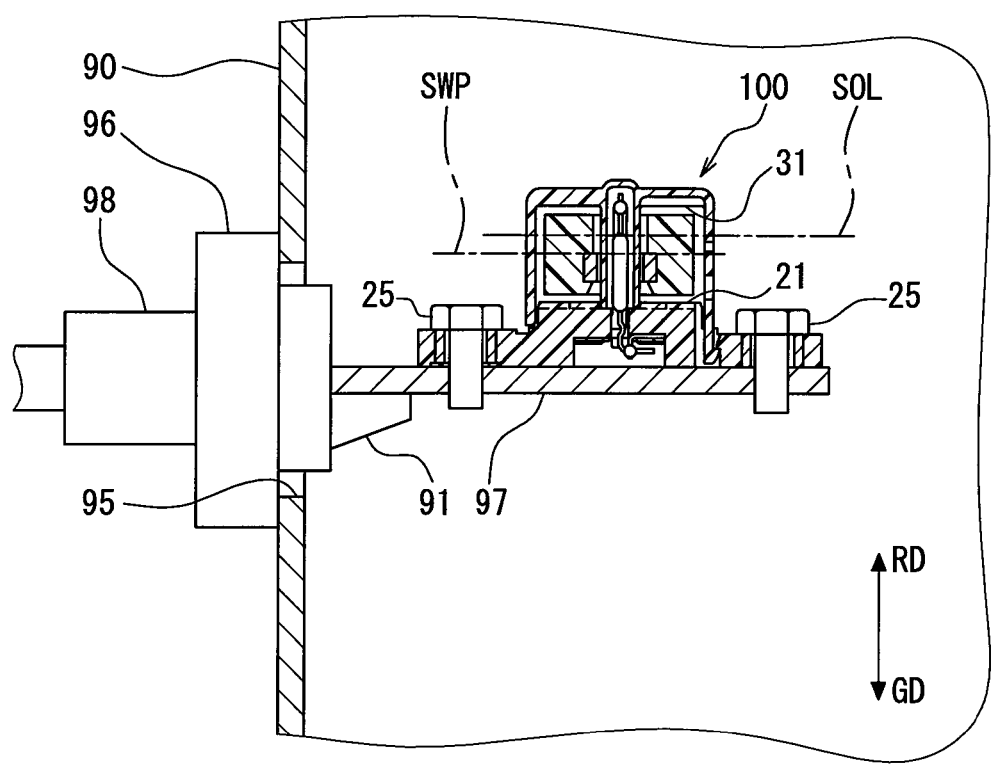
FIG. 1 is a view showing the state of installing a liquid level detector according to First Embodiment in a lower attachment position.

A liquid level detector 100 according to First Embodiment shown in FIG. 1 is mounted on an internal combustion engine and installed in an oil pan 90. The oil pan 90 is attached to the bottom face of a cylinder block of the internal combustion engine and stores engine oil as a liquid. The liquid level detector 100 detects the height of the surface of the engine oil stored in the oil pan 90.

The liquid level detector 100 is fixed to the oil pan 90 with a bracket 91 interposed. The bracket 91 has a lid section 96, a mounting section 97, and a connector section 98. The lid section 96 is formed into a disk shape having a diameter larger than an opening 95 for inserting the liquid level detector 100 into the oil pan 90. The lid section 96 covers the opening 95 by liquid-tightly adhering to the peripheral part of the opening 95 from the exterior of the oil pan 90. The mounting section 97 extends tabularly from the lid section 96. The mounting section 97 is supported by the lid section 96. The liquid level detector 100 is mounted on the top face of the mounting section 97 directed toward the direction opposite to the gravity direction GD (hereunder referred to as a "reverse direction RD"). The connector section 98 protrudes from the lid section 96 toward the exterior of the oil pan 90. A connector section (not shown in the figure) on the counterpart side for electrically connecting an external in-vehicle device (for example a combination meter or the like) to the liquid level detector 100 engages with the connector section 98.

Figure 2:
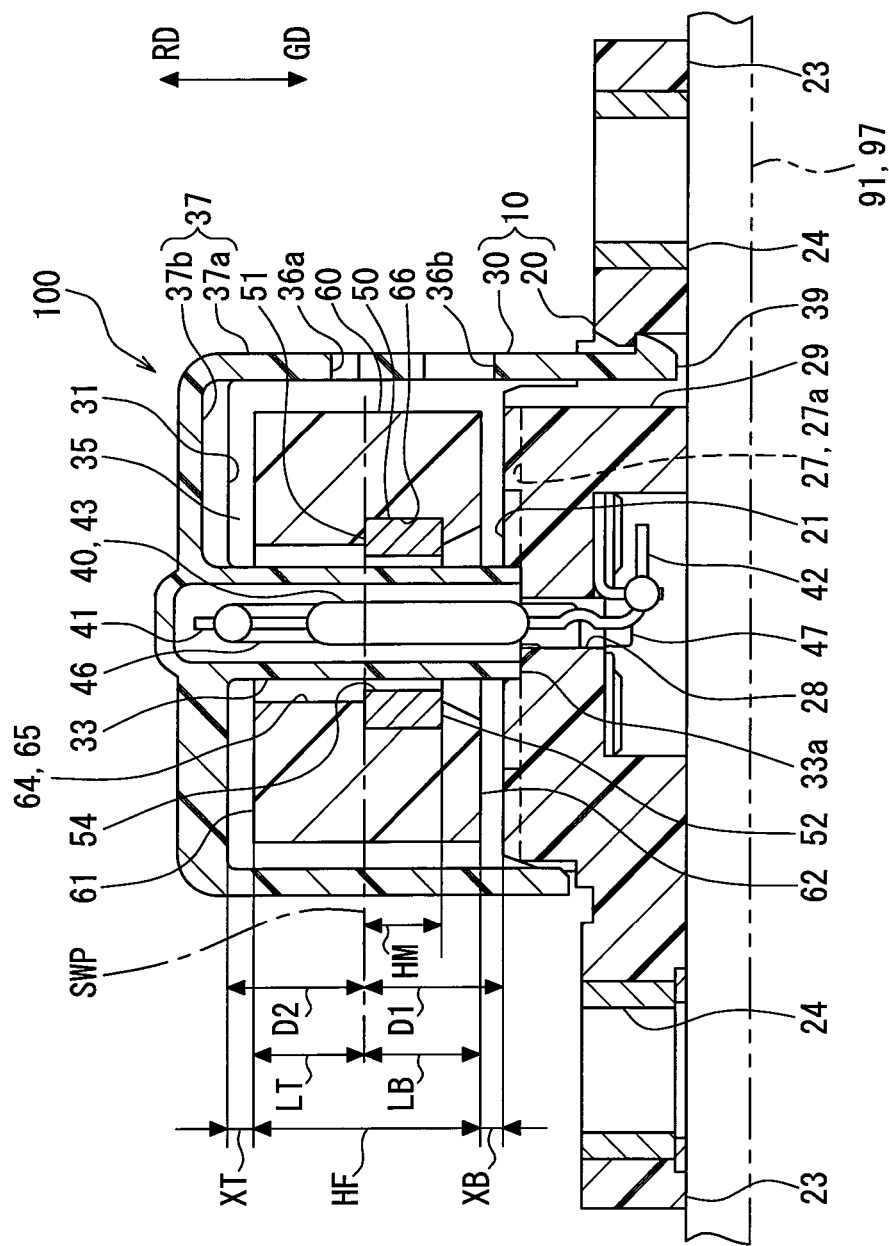
FIG. 2 is a view including a sectional view taken on a line II-II of FIG. 3 and explaining the configuration and operation of a liquid level detector installed in the lower attachment position.

As shown in FIG. 2, the liquid level detector 100 includes a casing 10, a float 60, a magnet 50, a reed switch 40, terminals 46 and 47 and others.

The casing 10 includes a body 20, a cover 30, and others. The body 20 and the cover 30 constitute an accommodating chamber 35 to contain the float 60. The body 20 and the cover 30 are formed of a polyphenylene sulfide (PPS) resin or the like for example.

Figure 3:
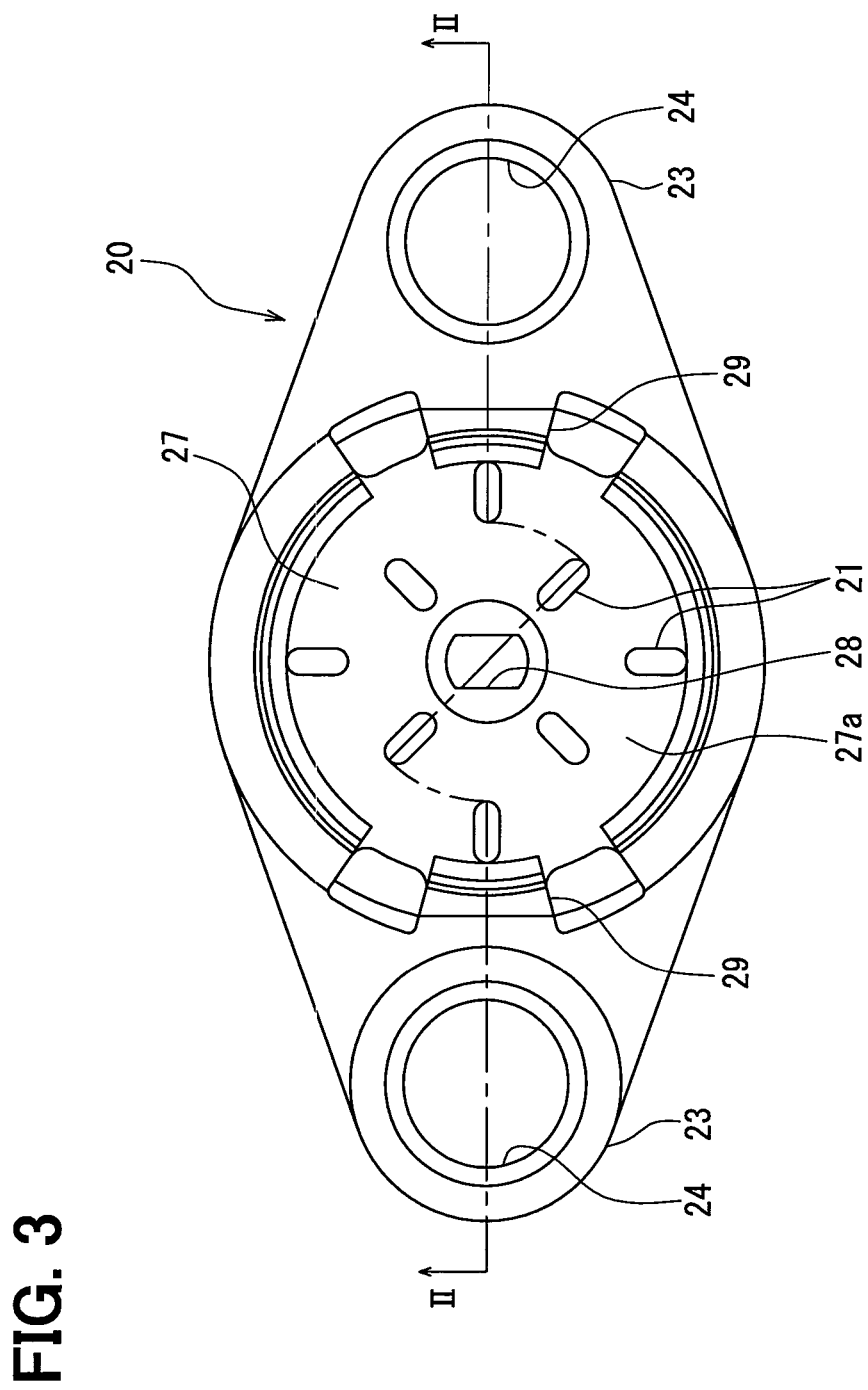
FIG. 3 is a plan view of a body according to First Embodiment.

The body 20 shown in FIGS. 2 and 3 has a flange section 23 and a body partition wall 27. The flange section 23 is formed into a flange-like shape outside the body partition wall 27 formed into a disk-like shape. Attachment rings 24 are embedded into the flange section 23. Further, locking holes 29 are formed into the flange section 23. The attachment rings 24 are cylindrical parts including a metal such as iron. Fastening members 25 (refer to FIG. 1) for fixing the body 20 to the mounting section 97 are inserted into the attachment rings 24. Four locking holes 29 are formed distantly from each other around the body partition wall 27. The locking holes 29 penetrate the flange section 23 in the gravity direction GD.

The body partition wall 27 is a wall section to partition the accommodating chamber 35 formed into a cylindrical shape. A through-hole 28 and body stoppers 21 are formed in the body partition wall 27. The through-hole 28 is formed in the center of the body partition wall 27. The through-hole 28 penetrates the body partition wall 27 in the gravity direction GD. The body stoppers 21 are formed protrusively from the wall face 27a of the body partition wall 27 toward the reverse direction RD. The body stoppers 21 extend in radial directions of the body partition wall 27. The body stoppers 21 are arranged at equally-spaced intervals (at the intervals of 90° for example) in a circumferential direction around the through-hole 28.

Figure 4:
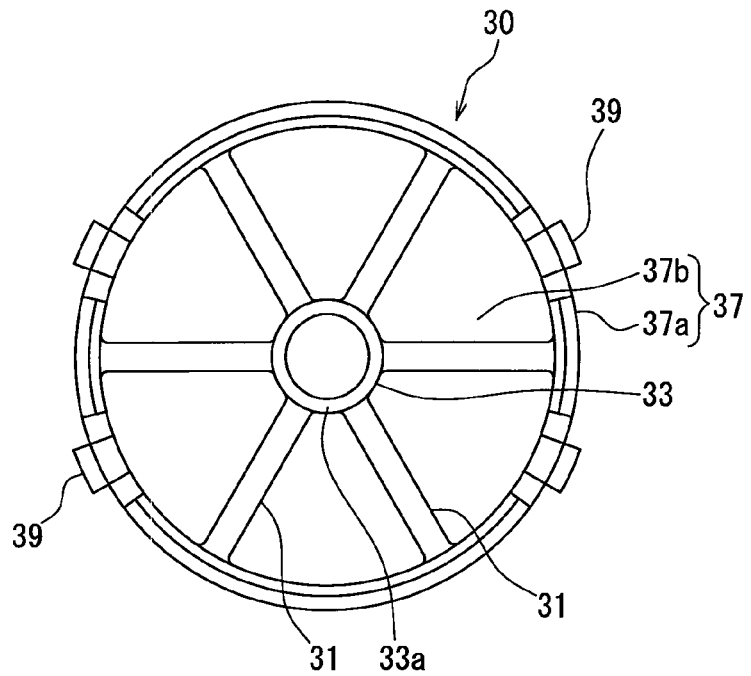
FIG. 4 is a bottom view of a cover according to First Embodiment.

The cover 30 shown in FIGS. 2 and 4 is formed into a cylindrical shape having a bottom as a whole. The cover 30 has a cylinder section 33, a cover partition wall 37, and locking nails 39. The cylinder section 33 is formed in the center in the radial direction at a bottom wall section 37b of the cover 30 and extends cylindrically along the axis of the cover 30. The reed switch 40 and the terminal 46 are contained in the cylinder section 33. A tip part 33a of the cylinder section 33 located on the side opposite to the bottom wall section 37b is in contact with the peripheral part of the body partition wall 27 around the through-hole 28.

The cover partition wall 37, together with the body partition wall 27, partitions the accommodating chamber 35. The cover partition wall 37 has a peripheral wall section 37a located on the outer periphery side of the float 60 and the bottom wall section 37b located in the reverse direction RD beyond the float 60. A plurality of communication holes 36a and 36b are formed in the peripheral wall section 37a. The communication holes 36a and 36b penetrate the peripheral wall section 37a in radial directions. The communication holes 36a and 36b make the accommodating chamber 35 located inside the peripheral wall section 37a communicate with the exterior of the peripheral wall section 37a. Meanwhile, cover stoppers 31 are formed at the bottom wall section 37b. The cover stoppers 31 are arranged so as to face the body stoppers 21 in the gravity direction GD (vertical direction). The cover stoppers 31 are extendedly formed radially from the cylinder section 33 toward the outside in radial directions. The cover stoppers 31 are arranged at equally-spaced intervals (at the intervals of 60° for example) in a circumferential direction around the cylinder section 33.

The locking nails 39 are arranged in accordance with the locking holes 29 and are formed at four sites in the peripheral wall section 37a. The locking nails 39 extend from the peripheral wall section 37a toward the gravity direction GD so as to be insertable into the locking holes 29. The cover 30 is retained by the body 20 by locking the locking nails 39 into the locking holes 29.

The float 60 shown in FIG. 2 is formed of a material having a specific gravity smaller than engine oil, such as a foamed phenol resin for example. The float 60 can float on the surface of engine oil. The float 60 is formed into a cylindrical shape having a center hole 64. The cylinder section 33 is inserted into the center hole 64. A circular retention groove 66 extending in the circumferential direction is formed on an inner wall face 65 of the center hole 64. The float 60 is arranged between the body stoppers 21 and the cover stoppers 31. A float top face 61 and a float bottom face 62 of the float 60 located on the sides opposite to each other with the magnet 50 interposed are formed into planar shapes. The vertical movement of the float 60 in the gravity direction GD is restricted by the contact between the float top face 61/the float bottom face 62 and the body stoppers 21/the cover stoppers 31.

The magnet 50 is a permanent magnet such as a ferrite magnet. The magnet 50 is formed into a cylindrical shape extending in the gravity direction GD. The outer diameter of the magnet 50 is set so as to be smaller than the outer diameter of the float 60. The inner diameter of a center hole 54 of the magnet 50 is set so as to be slightly smaller than the inner diameter of the center hole 64 of the float 60. The magnet 50 is fitted into the retention groove 66 and thus retained by the float 60. The magnet 50 moves vertically in conformity with a liquid level in the state of inserting the cylinder section 33 into the magnet 50 together with the float 60.

The reed switch 40 is a detection element for detecting a liquid level. The reed switch 40 has a main body part 43 formed into a cylindrical shape and a pair of reeds 41 and 42 extending from both the ends of the main body part 43 respectively. The reed switch 40 is contained in the cylinder section 33 in the position of directing the axis of the main body part 43 in the gravity direction GD. The main body part 43 is a glass tube of a hollow cylindrical shape and contains the end sections (hereunder referred to as "reed end sections") of the respective reeds 41 and 42. The reed end sections are installed bendably and face each other at a prescribed interval in a direction perpendicular to the gravity direction GD. When a magnetic field acts on the reeds 41 and 42 from the exterior, the reed end sections are magnetized into magnetic poles different from each other and attract each other. By the contact of the reed end sections in this way, the reed switch 40 comes to be in an on-state of being conductive between the reeds 41 and 42.

The on-state and the off-state of the reed switch 40 are switched in accordance with the relative position of the magnet 50. It is possible to define a virtual switching plane SWP of the reed switch 40 for switching the on-state and the off-state in this way beforehand. The reed switch 40 keeps the on-state in the state where the magnet 50 strides the switching plane SWP in the gravity direction GD. In contrast, the reed switch 40 comes to be in the off-state in the state where the top end face 51 of the magnet 50 is located in the gravity direction GD beyond the switching plane SWP or in the state where the bottom end face 52 of the magnet 50 is located in the reverse direction RD beyond the switching plane SWP. The switching plane SWP is a plane perpendicular to the axis of the main body part 43 and is defined at a location passing through the reed ends in contact with each other. In addition, the switching plane SWP according to First Embodiment is defined at a location closer to the terminal 46 than the center of the main body part 43 in the axial direction.

The terminals 46 and 47 are formed of an electrically conductive material such as brass and are formed into a band shape. The terminals 46 and 47 are formed so as to be inserted into the body 20 and are thereby retained by the body 20. The terminal 46 is contained in the cylinder section 33 and extends in the reverse direction RD up to a location closer to the bottom wall section 37b than to the main body part 43. The terminal 46 is connected to the reed 41 and supports the reed 41. The terminal 47 is connected to the other reed 42 in the vicinity of the through-hole 28 and supports the reed 42. The reed switch 40 is attached to the terminals 46 and 47 and is thereby retained by the body 20.

Figure 5:
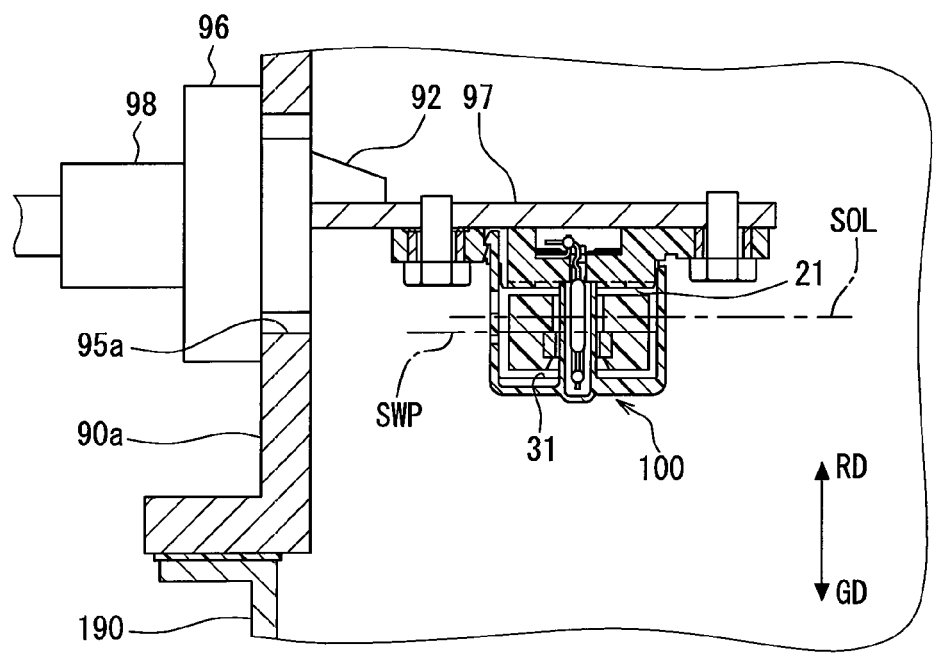
FIG. 5 is a view showing a liquid level detector according to First Embodiment attached in an upper attachment position.

The liquid level detector 100 explained heretofore is, as shown in FIG. 1, installed on the top face of the bracket 91 in a position of locating the body stoppers 21 lower than the cover stoppers 31 in the gravity direction GD (hereunder referred to as a "lower attachment position"). In addition, the liquid level detector 100 can, as shown in FIG. 5, be installed on the bottom face of a bracket 92 in a position of locating the cover stoppers 31 lower than the body stoppers 21 in the gravity direction GD (hereunder referred to as an "upper attachment position"). The configuration of the liquid level detector 100 that makes it possible to be attached in different attachment positions of the lower attachment position and the upper attachment position as stated above is hereunder explained in detail.

Meanwhile, the bracket 92 used for the installation in the upper attachment position has a lid section 96, a mounting section 97, and a connector section 98, which are substantially identical to the bracket 91 (refer to FIG. 1) used for the installation in the lower attachment position. The bracket 92 is inserted into an opening 95a of a structure 90a formed between an oil pan 190 and an engine block (not shown in the figure).

Figure 6:
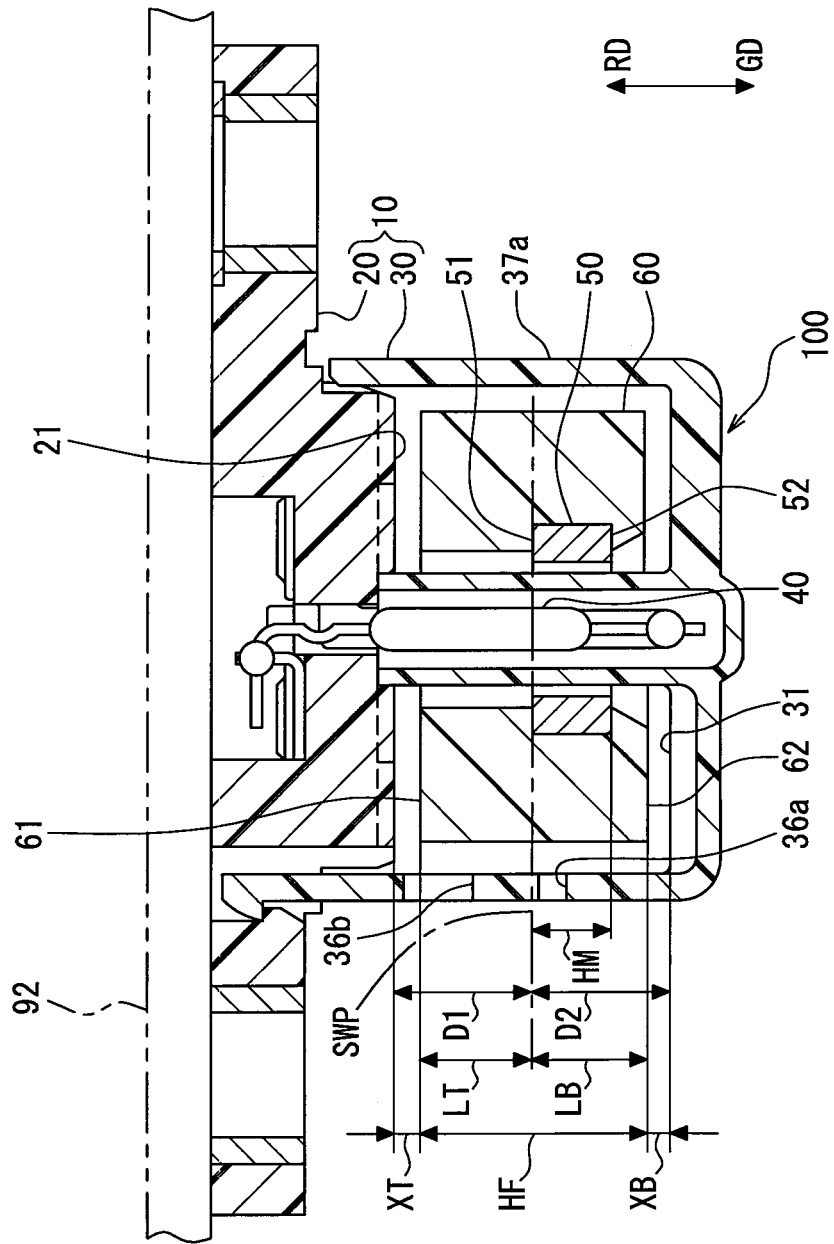
FIG. 6 is a view explaining the configuration and operation of a liquid level detector according to First Embodiment installed in the upper attachment position.

As comparatively shown in FIGS. 2 and 6, the vertical direction of the casing 10 is reversed in response to the installation position of the liquid level detector 100. On the other hand, the float 60 is, regardless of the installation position of the casing 10, arranged between the body stoppers 21 and the cover stoppers 31 in a position of directing the specific float bottom face 62 in the gravity direction GD.

In the arrangement position of the float 60, the magnet 50 is retained at a location deviating toward the gravity direction GD (downward) from the center of the float 60 in the axial direction along the gravity direction GD. In First Embodiment, in both the end faces of the magnet 50 in the axial direction (extending direction), the top end face 51 is arranged in the center of the float 60 in the axial direction. From the above, when the vertical dimension of the float 60 in the gravity direction GD is defined as a float height HF and the dimension from the float bottom face 62 to the top end face 51 is defined as a lower dimension LB, the lower dimension LB is a half of the float height HF. Further, when the dimension from the top end face 51 to the float top face 61 is defined as an upper dimension LT, the upper dimension LT is substantially equal to the lower dimension LB.

In the casing 10, the distance from the switching plane SWP to the body stoppers 21 is defined as a first distance D1. Then the distance from the switching plane SWP to the cover stoppers 31 is defined as a second distance D2. The distance D1 and the distance D2 are defined so as to be substantially equal. In addition, the distance D1 and the distance D2 are set so as to be longer than the lower dimension LB and the upper dimension LT.

In the float 60, the top end face 51 is set so as to be located on the switching plane SWP when a liquid level is a prescribed detection liquid level SOL (refer to FIGS. 1 and 5). In the state of locating the top end face 51 on the switching plane SWP in this way, the gap formed between either of the body stoppers 21 and the cover stoppers 31 which is located in the reverse direction RD and the float top face 61 is defined as an upper gap XT. Then the gap formed between either of the body stoppers 21 and the cover stoppers 31 which is located in the gravity direction GD and the float bottom face 62 is defined as a lower gap XB. The upper gap XT and the lower gap XB are substantially equal to each other. In addition, the upper gap XT is set so as to be shorter than the vertical dimension HM of the magnet 50 in the axial direction.

The communication hole 36a is formed at a part of the peripheral wall section 37a closer to the cover stoppers 31 than to the switching plane SWP. The other communication hole 36b is formed at a part of the peripheral wall section 37a closer to the body stoppers 21 than to the switching plane SWP. By the arrangement, the communication holes 36a and 36b are located on both the sides interposing the switching plane SWP at least one by one regardless of the installation position of the casing 10. Further, the inner diameter of the communication hole 36b is set so as to be larger than the inner diameter of the communication hole 36a.

In the case of installing the liquid level detector 100 on the bracket 91 in the lower attachment position as shown in FIGS. 1 and 2, when the a liquid level is sufficiently higher than the detection liquid level SOL, the upward movement of the float 60 is restricted by the contact of the float top face 61 to the cover stoppers 31. On this occasion, since the upper dimension LT is shorter than the second distance D2, the top end face 51 can be located in the reverse direction RD (upward) beyond the switching plane SWP. In addition, since the upper gap XT between the float top face 61 and the cover stoppers 31 is shorter than the magnet height HM, the bottom end face 52 can be located in the gravity direction GD (downward) beyond the switching plane SWP. From the above, since the magnet 50 is in the state of striding the switching plane SWP in the gravity direction GD, the reed switch 40 comes to be in the on-state by the magnetic field generated by the magnet 50.

Then when the stored engine oil reduces, since the first distance D1 is longer than the lower dimension LB, the top end face 51 can move in the gravity direction GD (downward) beyond the switching plane SWP before the float bottom face 62 comes into contact with the body stoppers 21. The reed switch 40 can therefore switch from the on-state to the off-state by having the liquid level of the engine oil descend below the detection liquid level SOL.

Meanwhile, in the case of installing the liquid level detector 100 on the bracket 92 in the upper attachment position as shown in FIGS. 5 and 6, when a liquid level is sufficiently higher than the detection liquid level SOL, the upward movement of the float 60 is restricted by the contact of the float top face 61 to the body stoppers 21. On this occasion, since the upper dimension LT is shorter than the first distance D1, the top end face 51 can be located in the reverse direction RD (upward) beyond the switching plane SWP. In addition, since the upper gap XT between the float top face 61 and the body stoppers 21 is shorter than the magnet height HM, the bottom end face 52 can be located in the gravity direction GD (downward) beyond the switching plane SWP. From the above, since the magnet 50 is in the state of striding the switching plane SWP in the gravity direction GD, the reed switch 40 comes to be in the on-state by the magnetic field generated by the magnet 50.

Then when the engine oil reduces, since the second distance D2 is longer than the lower dimension LB, the top end face 51 can move in the gravity direction GD (downward) beyond the switching plane SWP before the float bottom face 62 comes into contact with the cover stoppers 31. The reed switch 40 can therefore switch from the on-state to the off-state similarly to the case of being installed in the lower attachment position by having the liquid level of the engine oil descend below the detection liquid level SOL.

According to First Embodiment heretofore explained, in each of the assumed upper attachment position and lower attachment position, the reed switch 40 switches from the on-state to the off-state in response to the descent of a liquid level. Consequently, it is possible to vertically reverse the attachment direction of the liquid level detector 100 without changing the operating mode in the switching of the reed switch 40 even when a casing 10 of an identical shape is adopted.

According to First Embodiment additionally, both the first distance D1 and the second distance D2 are longer than the upper dimension LT. It is therefore possible to locate the top end face 51 in the reverse direction RD (upward) beyond the switching plane SWP in the state where the float top face 61 is in contact with either of the body stoppers 21 or the cover stoppers 31 regardless of the installation position of the casing 10. Consequently, the operation of the magnet 50 to move the top end face 51 downward from above the switching plane SWP is realizable without fail.

According to First Embodiment further, since the installation position of the float 60 is the same regardless of the installation position of the casing 10, the lower dimension LB does not change in any installation position. Consequently, the lengths required of the first distance D1 and the second distance D2 are substantially identical. By equalizing the first distance D1 and the second distance D2 and also reducing them therefore, it is possible to reduce the vertical size of the casing 10 in the gravity direction GD. In this way, since not only the flexibility of the installation position is secured but also the downsizing can be obtained, the liquid level detector 100 can be installed in oil pans or the like of more various shapes.

According to First Embodiment furthermore, since the upper gap XT is shorter than the magnet height HM, the magnet 50 can keep the state of striding the switching plane SWP in the gravity direction GD even when the float 60 ascends up to a location of coming into contact with the body stoppers 21 or the cover stoppers 31. Consequently, the reed switch 40 can keep the on-state. From the above, the situation in which the bottom end face 52 undesirably moves in the reverse direction RD (upward) beyond the switching plane SWP and the on-state shifts to the off-state when a liquid level is sufficiently high is avoided.

According to First Embodiment additionally, at least either of the communication holes 36a and 36b is located in the gravity direction GD (downward) beyond the switching plane SWP even in the case of installing the casing 10 in the lower attachment position or the upper attachment position. Engine oil can therefore flow out from the accommodating chamber 35 by all means regardless of the installation position of the casing 10. Consequently, the accuracy of liquid level detection by the liquid level detector 100 is kept high even when the installation position of the casing 10 is reversed vertically.

Like First Embodiment further, in the case of intending to switch the reed switch 40 from the on-state to the off-state in response to the descent of a liquid level, the top end face 51 has to have moved downward beyond the switching plane SWP when the float 60 descends. The magnet 50 therefore is preferably retained at a location deviating downward from the center of the float 60. By such arrangement of the magnet 50, the lower dimension LB can be reduced. From the above, since the first distance D1 and the second distance D2 can also be reduced, the downsizing of the casing 10 in the vertical direction can be materialized.

Meanwhile, in First Embodiment, the body stoppers 21 correspond to a "first regulatory section", the cover stoppers 31 correspond to a "second regulatory section", and the body partition wall 27 and the cover partition wall 37 correspond to "partition walls". Further, the reed switch 40 corresponds to a "switch mechanism", the magnet 50 corresponds to a "magnet body", and the top end face 51 corresponds to a "magnet end face". Furthermore, the float top face 61 corresponds to a "top end section", the float bottom face 62 corresponds to a "(specific) bottom end section", and the oil pan 90 and the oil pan 190 and the structure 90a correspond to "containers" respectively. Then the lower attachment position corresponds to a "first position" and the upper attachment position corresponds to a "second position".

Second Embodiment

Figure 7:
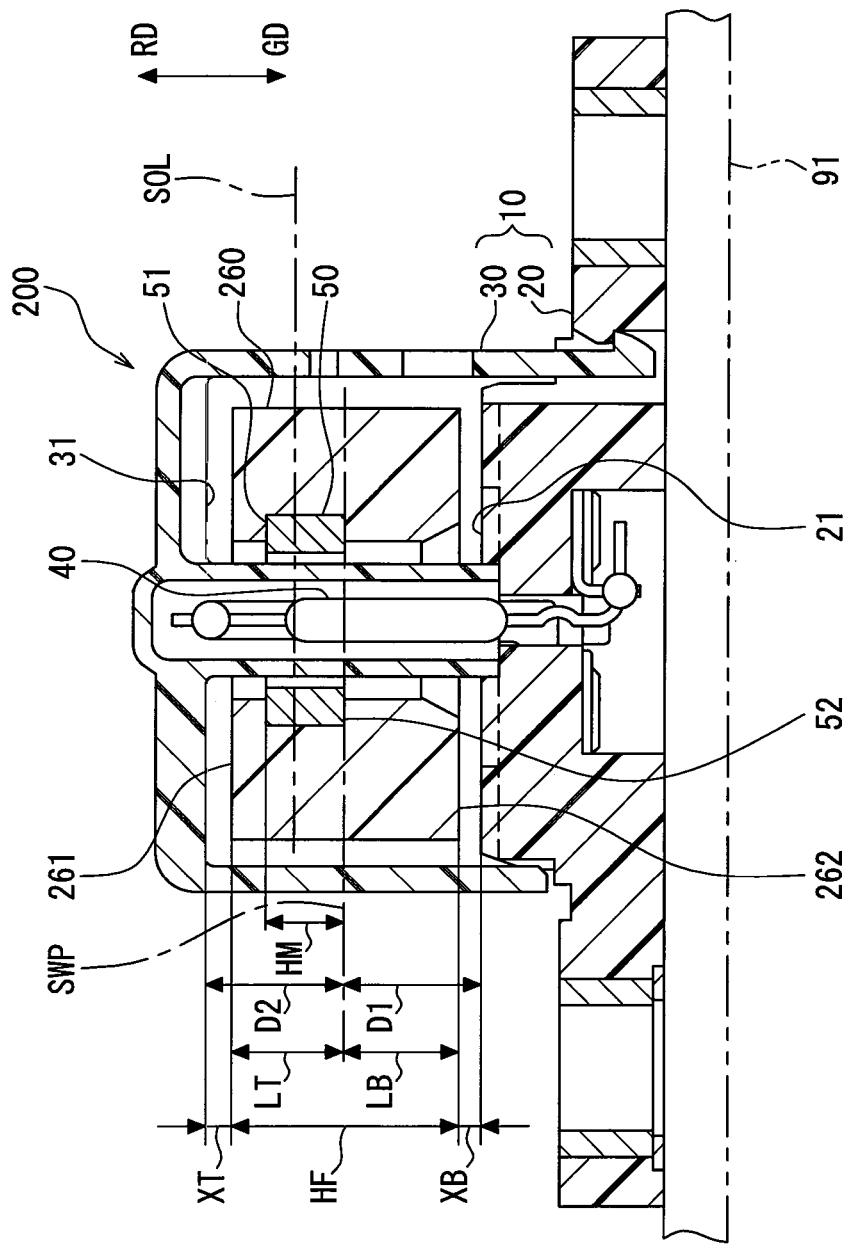
FIG. 7 is a view explaining the configuration and operation of a liquid level detector according to Second Embodiment installed in the lower attachment position.
Figure 8:
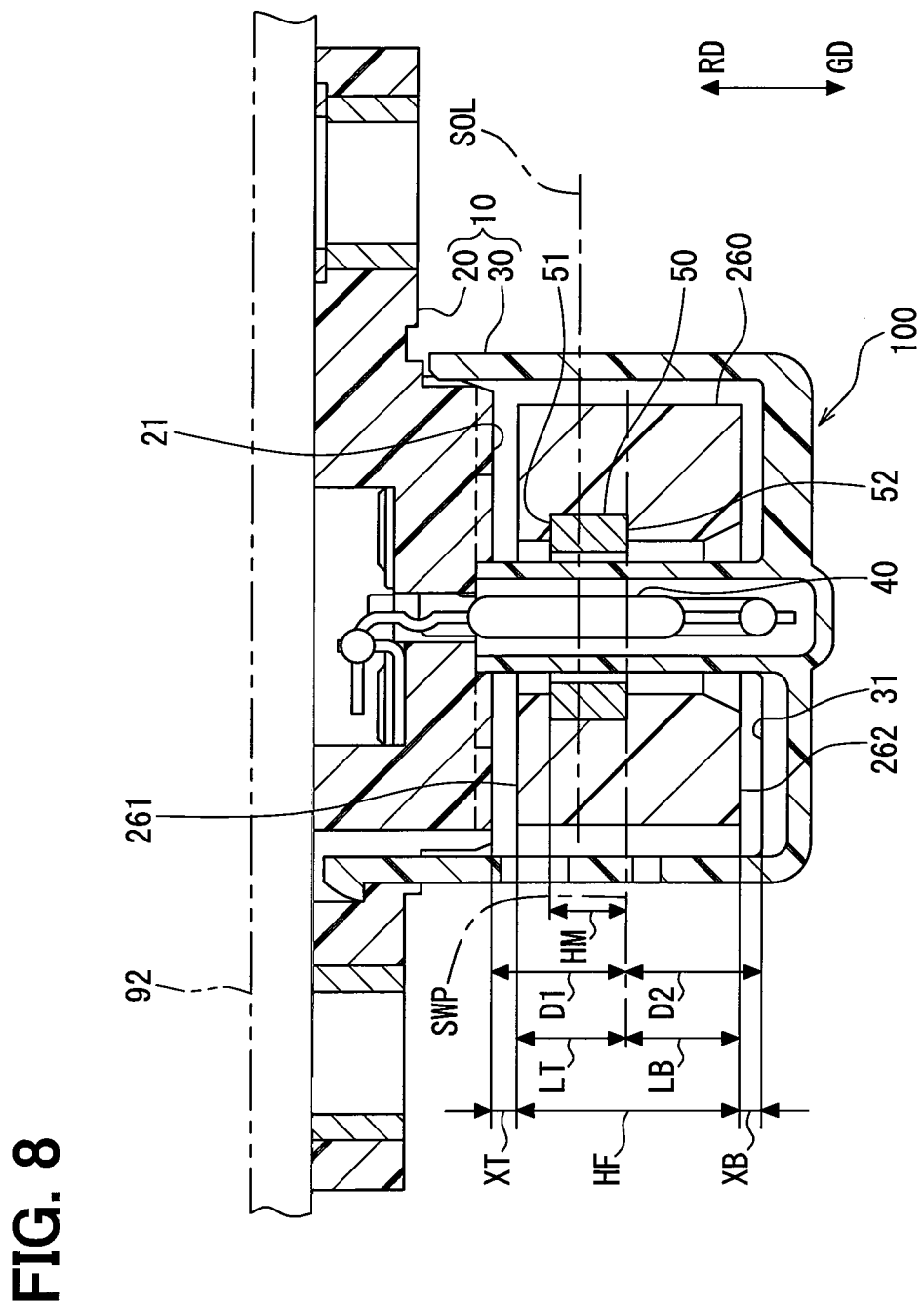
FIG. 8 is a view explaining the configuration and operation of a liquid level detector according to Second Embodiment installed in the upper attachment position.

Second Embodiment shown in FIGS. 7 and 8 is a modified example of First Embodiment. In a liquid level detector 200 according to Second Embodiment, the operating mode of a reed switch 40 accompanying the descent of a liquid level is different from the liquid level detector 100 (refer to FIG. 2) according to First Embodiment. Concretely, in the liquid level detector 200, the reed switch 40 switches from an off-state to an on-state when a liquid level is below a detection liquid level SOL. The configuration of the liquid level detector 200 is hereunder explained in detail.

The liquid level detector 200 has a float 260 corresponding to the float 60 (refer to FIG. 2) according to First Embodiment. The float 260 is arranged between body stoppers 21 and cover stoppers 31 in a position of directing a specific float bottom face 262 in the gravity direction GD regardless of the installation position of a casing 10. A magnet 50 is retained at a location deviating in the reverse direction RD (upward) from the center of the float 260 in the axial direction. A bottom end face 52 of the magnet 50 is arranged in the center of the float 260 in the axial direction. Then when the dimension from the float bottom face 262 to the bottom end face 52 is defined as a lower dimension LB, the lower dimension LB is set so as to be a half of a float height HF. Further, when the dimension from the bottom end face 52 to a float top face 261 is defined as an upper dimension LT, the upper dimension LT is set so as to be substantially equal to the lower dimension LB. The lower dimension LB and the upper dimension LT are set so as to be shorter than a first distance D1 and a second distance D2.

The float 260 locates the bottom end face 52 on a switching plane SWP when a liquid level is at a prescribed detection liquid level SOL. In this way, an upper gap XT and a lower gap XB are substantially equal to each other in the state of locating the bottom end face 52 on the switching plane SWP. In addition, the lower gap XB is set so as to be shorter than a magnet height HM.

In the case of installing the liquid level detector 200 on a bracket 91 in a lower attachment position as shown in FIG. 7, when a liquid level is sufficiently higher than the detection liquid level SOL, the upward movement of the float 260 is restricted by the contact of the float top face 261 to the cover stoppers 31. On this occasion, since the upper dimension LT is shorter than the second distance D2, the bottom end face 52 can be located in the reverse direction RD (upward) beyond the switching plane SWP. From the above, a reed switch 40 comes to be in the off-state.

Then when engine oil reduces, since the first distance D1 is longer than the lower dimension LB, the bottom end face 52 can move in the gravity direction GD (downward) beyond the switching plane SWP before the float bottom face 262 comes into contact with the body stoppers 21. In addition, since the lower gap XB between the float bottom face 262 and the body stoppers 21 is shorter than the magnet height HM, the top end face 51 can be located in the reverse direction RD (downward) beyond the switching plane SWP. From the above, since the magnet 50 is in the state of striding the switching plane SWP in the gravity direction GD, the reed switch 40 comes to be in the on-state by the magnetic field generated by the magnet 50. Consequently, the liquid level of the engine oil is lower than the detection liquid level SOL and resultantly the reed switch 40 can switch from the off-state to the on-state.

Meanwhile, in the case of installing the liquid level detector 200 on a bracket 92 in an upper attachment position as shown in FIG. 8, when a liquid level is sufficiently higher than the detection liquid level SOL, the upward movement of the float 260 is restricted by the contact of the float top face 261 to the body stoppers 21. On this occasion, since the upper dimension LT is shorter than the first distance D1, the bottom end face 52 can be located in the reverse direction RD (upward) beyond the switching plane SWP. From the above, the reed switch 40 comes to be in the off-state.

Then when engine oil reduces, since the second distance D2 is longer than the lower dimension LB, the bottom end face 52 can move in the gravity direction GD (downward) beyond the switching plane SWP before the float bottom face 262 comes into contact with the cover stoppers 31. In addition, since the lower gap XB between the float bottom face 262 and the cover stoppers 31 is shorter than the magnet height HM, the top end face 51 can be located in the reverse direction RD (upward) beyond the switching plane SWP.

From the above, since the magnet 50 is in the state of striding the switching plane SWP in the gravity direction GD, the reed switch 40 comes to be in the on-state by the magnetic field generated by the magnet 50. Consequently, the liquid level of the engine oil is lower than the detection liquid level SOL and resultantly the reed switch 40 can switch from the off-state to the on-state in the same manner as the case of being installed in the lower attachment position.

According to Second embodiment heretofore explained, in each of the upper attachment position and the lower attachment position, the reed switch 40 switches from the off-state to the on-state in response to the descent of a liquid level. Consequently, it is possible to vertically reverse the attachment direction of the liquid level detector 200 without changing the operating mode in the switching of the reed switch 40 even when a casing 10 of an identical shape is adopted.

According to Second Embodiment additionally, since the lower gap XB is shorter than the magnet height HM, the magnet 50 can keep the state of striding the switching plane SWP in the gravity direction GD even when the float 260 descends up to a location of coming into contact with the body stoppers 21 or the cover stoppers 31. Consequently, the reed switch 40 can keep the on-state. From the above, the situation in which the top end face 51 undesirably moves in the gravity direction GD (downward) beyond the switching plane SWP and the on-state shifts to the off-state when a liquid level descends considerably is avoided.

Like Second Embodiment further, in the case of intending to switch the reed switch 40 from the off-state to the on-state in response to the descent of a liquid level, the bottom end face 52 has to have moved upward beyond the switching plane SWP when the float 260 ascends. The magnet 50 therefore is preferably retained at a location deviating upward from the center of the float 260. By such arrangement of the magnet 50, the upper dimension LT can be reduced. From the above, since the first distance D1 and the second distance D2 can also be reduced, the downsizing of the casing 10 in the vertical direction can be materialized.

Meanwhile, in Second Embodiment, the bottom end face 52 corresponds to a "magnet end face", the float top face 261 corresponds to a "top end section", and the float bottom face 262 corresponds to a "(specific) bottom end section".

Although the embodiments have heretofore been explained, the present disclosure should not be interpreted only by the embodiments and can be applied to various embodiments and combinations within the scope not departing from the tenor of the present disclosure.

In the embodiments, the switching plane SWP is defined at a location deviating toward the side of the reed 41 from the center of the main body part 43 in the axial direction. The location of the switching plane SWP however may arbitrarily be changed. For example, the switching plane SWP may be defined in the center of the main body part in the axial direction or may be defined at a location deviating toward the side of the reed 42 from the center of the main body part.

In the embodiments, the top end face 51 or the bottom end face 52 of the magnet 50 is located in the center of the float in the axial direction. The location where a magnet is mounted on a float however may arbitrarily be changed. Further, the shapes of the magnet and the float are not limited to such cylindrical shapes as adopted in the embodiments. The float may be formed into a spherical shape or a prismatic shape for example as long as a necessary buoyant force can be obtained. Further, the magnet may be formed into a tabular shape and arranged so as to face each other with a reed switch interposed.

In the embodiments, the first distance D1 and the second distance D2 are set so as to be equal to each other. The first distance D1 and the second distance D2 however may have lengths different from each other as long as they are longer than the upper dimension LT and the lower dimension LB.

In the embodiments, the upper gap XT and the lower gap XB are set so as to be smaller than the magnet height HM. In the situation of setting the reed switch 40 in the off-state when a liquid level is very low like First Embodiment however for example, the lower gap XB may be larger than the magnet height HM. Further, in the situation of setting the reed switch 40 in the off-state when a liquid level is sufficiently high like Second Embodiment, the upper gap XT may be larger than the magnet height HM.

In the embodiments, the communication holes 36a and 36b are formed one above the other with the switching plane SWP interposed. The number, the locations, the shapes of the communications holes however may be changed arbitrarily so as not to be clogged by foam generated in a liquid or the like. Further, the container to contain the float may not be arranged in the casing.

In the embodiments, the liquid level detector is fixed to the container such as the oil pan with the bracket interposed. The structure for attaching the liquid level detector however is not limited to the aforementioned cases. For example, a configuration in which the liquid level detector is attached directly to the bracket arranged in the oil pan and is connected to the lid section 96 with a harness is also acceptable.

Although the explanations have heretofore been made on the basis of the cases of applying the present disclosure to the liquid level detector to detect the liquid level of engine oil stored in an oil pan or the like of a vehicle, the application of the present disclosure is not limited to the detection of the liquid level of the engine oil. The present disclosure is applicable to a liquid level detector in a container for another liquid, such as a brake fluid, engine cooling water, a fuel, or the like, mounted on a vehicle. Moreover, the present disclosure is applicable to a liquid level detector not only for a vehicle but also in a container arranged in various kinds of consumer devices and various kinds of transport machines.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A liquid level detector for detecting a level of a surface of liquid stored in a container, the detector comprising:
   a casing that is fixed to the container and includes a first regulatory section and a second regulatory section which are opposed to each other in a gravity direction;
   a float that floats on the surface of liquid and has its upward and downward displacement along the gravity direction restricted by contact of the float with the first regulatory section or the second regulatory section;
   a magnet body that has a shape extending along the gravity direction and is held by the float to be displaced upward or downward in conformity with the surface of liquid; and a switch mechanism having an on-state and an off-state is held by the casing, wherein:
when one magnet end face of the magnet body in its extending direction is displaced in the gravity direction beyond a predetermined virtual switching plane, the switch mechanism is switched from one to the other of the on-state and the off-state;
the casing is configured to be disposed in a first position when the first regulatory section is located further in the gravity direction than the second regulatory section, and is configured to be disposed in a second position when the second regulatory section is located further in the gravity direction than the first regulatory section;
the float is arranged between the first regulatory section and the second regulatory section in a position where a specific bottom end section of the float is directed in the gravity direction;
a first distance from the switching plane to the first regulatory section and a second distance from the switching plane to the second regulatory section are both longer than a length from the one magnet end face to the bottom end section;
the first regulatory section is one of a plurality of first regulatory sections;
the plurality of first regulatory sections extend in a radially outward direction from a central axis of the magnet body along the gravity direction, and are arranged at equally-spaced intervals in a circumferential direction around the central axis;
the second regulatory section is one of a plurality of second regulatory sections; and
the plurality of second regulatory sections extend radially from a central section to a peripheral wall section of the casing, and are arranged at equally-spaced intervals in a circumferential direction around the central section.

2. The liquid level detector according to claim 1, wherein a length from a top end section of the float located on an opposite side of the magnet body from the bottom end section to the one magnet end face is shorter than the first distance and the second distance.

3. The liquid level detector according to claim 1, wherein the one magnet end face is arranged at a center of the float in the gravity direction.

4. The liquid level detector according to claim 1 wherein the first distance is substantially equal to the second distance.

5. The liquid level detector according to claim 1, wherein:
a gap formed between a top end section of the float that is located on an opposite side of the magnet body from the bottom end section and one of the first regulatory section and the second regulatory section that is opposed to the top end section in a state where the one magnet end face is located on the switching plane is defined as an upper gap; and
the upper gap is shorter than a size of the magnet body along the gravity direction.

6. The liquid level detector according to claim 1, wherein:
the casing includes a partition wall and an accommodating chamber that is defined by the partition wall to accommodate the float; and
the partition wall includes at least one communication hole, which communicates between an inside and outside of the accommodating chamber, on each of both sides of the switching plane.

7. The liquid level detector according to claim 1, wherein:
the magnet body is retained at a position shifted downward from a center of the float in the gravity direction; and
when the one magnet end face located on an upper side of the magnet body is displaced in the gravity direction beyond the switching plane, the switch mechanism is switched from the on-state to the off-state.

8. The liquid level detector according to claim 1, wherein:
the magnet body is retained at a position shifted upward from a center of the float in the gravity direction; and
when the one magnet end face located on a lower side of the magnet body is displaced in the gravity direction beyond the switching plane, the switch mechanism is switched from the off-state to the on-state.

9. The liquid level detector according to claim 1, wherein the plurality of first regulatory sections are arranged at equally-spaced 90° intervals in the circumferential direction around the central axis.

10. The liquid level detector according to claim 1, wherein the plurality of first regulatory sections include four first regulatory sections arranged at equally-spaced intervals in the circumferential direction around the central axis.

11. The liquid level detector according to claim 1, wherein the plurality of second regulatory sections are arranged at equally-spaced 60° intervals in the circumferential direction around the central section.

12. The liquid level detector according to claim 1, wherein the plurality of second regulatory sections include six second regulatory sections arranged at equally-spaced intervals in the circumferential direction around the central section.

* * * * *